May 19, 1964 L. M. HALLS 3,133,397
HITCH STRUCTURE
Filed Nov. 26, 1962 3 Sheets-Sheet 1

INVENTOR.
LAWRENCE M. HALLS
BY Walter V. Wright
AGENT

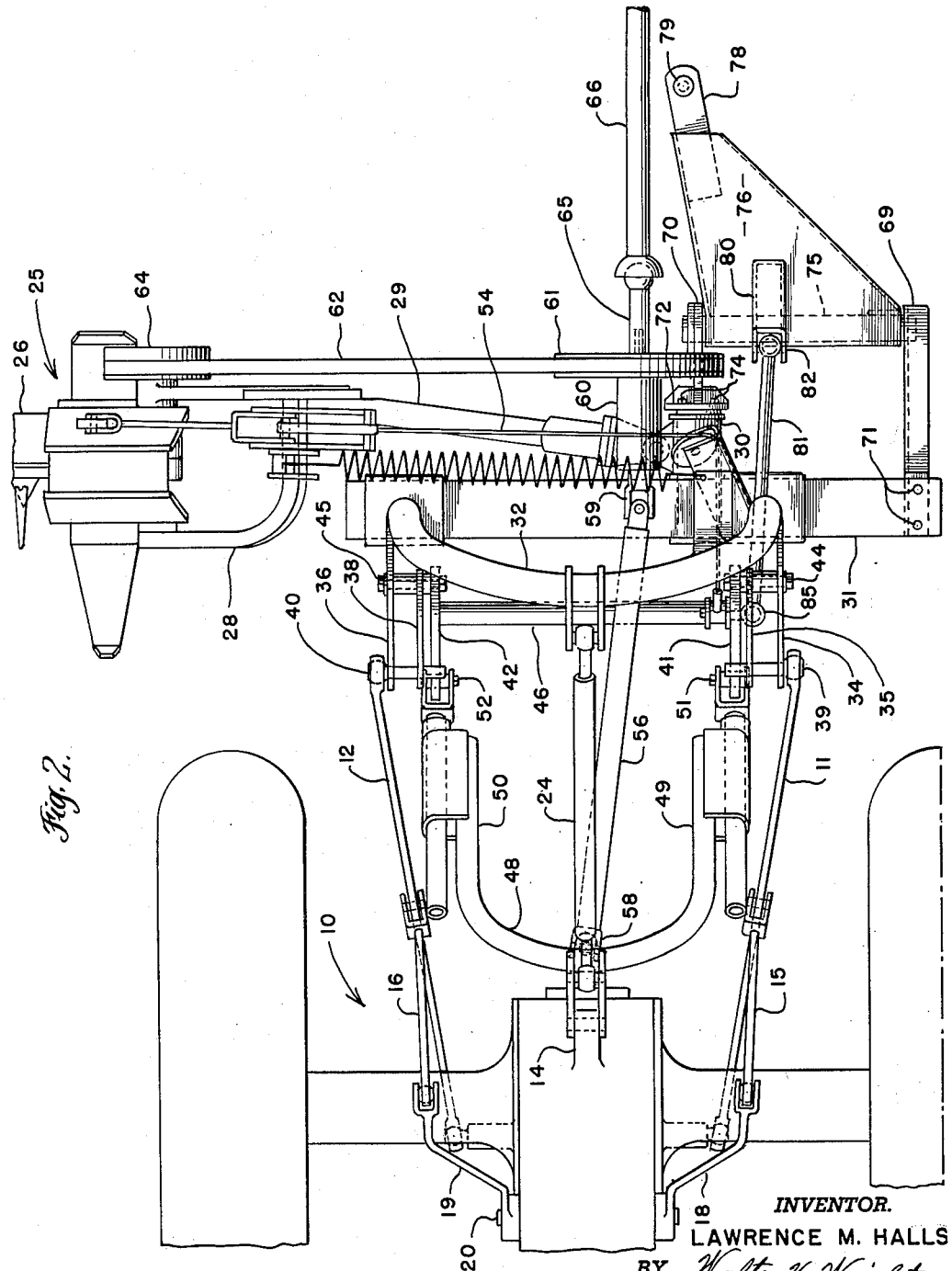

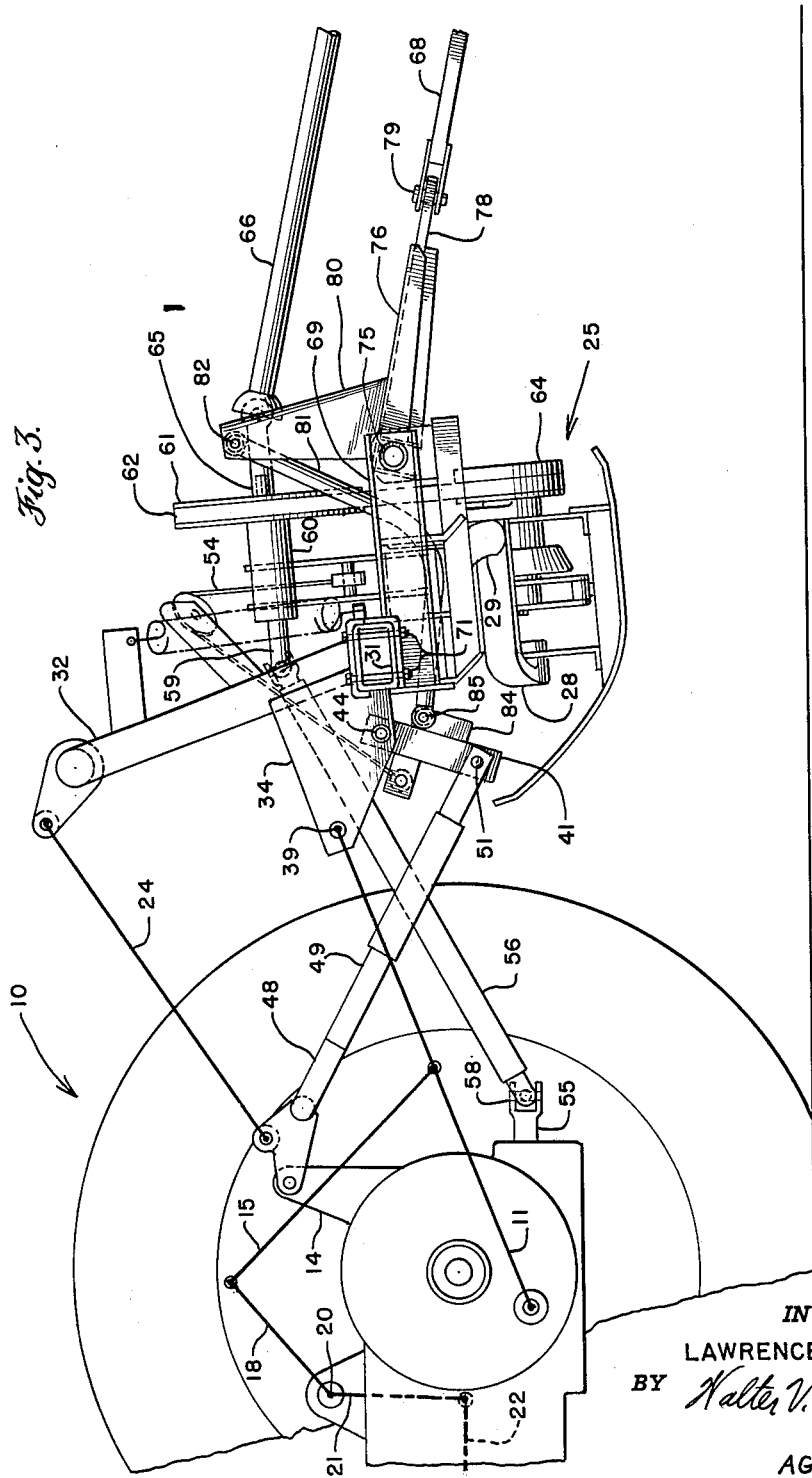

United States Patent Office

3,133,397
Patented May 19, 1964

3,133,397
HITCH STRUCTURE
Lawrence M. Halls, New Holland, Pa., assignor to Sperry Rand Corporation, New Holland, Pa., a corporation of Delaware
Filed Nov. 26, 1962, Ser. No. 239,964
7 Claims. (Cl. 56—25)

This invention relates to tractor mounted agricultural mowers. More specifically, this invention relates to hitch structure for trailing a crop conditioner behind a tractor mounted mower.

It is now common practice for a farmer to tow a crop conditioner behind his tractor as he mows a field. Since mower cutter bars project laterally to one side of the tractor, a crop conditioner trailing the tractor conditions the crop material that was cut by the mower on the preceding pass around the field. This is an efficient, time saving method of reducing the field drying time required between the mowing and baling of a crop of hay or the like.

The customary practice is to attach a hitch to the mower frame and connect the crop conditioner to the mower carried hitch. It is a simple matter to tow a crop conditioner behind a semi-mounted mower or a trail type mower; since, the frames of these mowers are supported, at least in part, by a ground engaging wheel and therefore remain a uniform distance above the ground at all times. In the case of fully mounted mowers, however, little success has been realized in trailing a hay conditioner behind the mower.

As is well known, the mounted type mowers are commonly carried on a pair of vertically swingable drawbars extending rearwardly from the tractor. The entire mower is raised and lowered relative to the ground by mechanism on the tractor, usually the tractor hydraulic system, which raises and lowers the drawbars on which the mower is carried. This raising and lowering of the mower results in binding at the hitch connection between the mower frame and the draft member of a crop conditioner connected thereto. If the hitch connection is made loose enough to prevent binding, the shock resulting from the loose draft connection, as the mechanism traverses a field, is transmitted through the conditioner drive train which extends from the tractor power-take-off shaft through the mower drive mechanism to the crop conditioner. This may result in damage to the drive train or to the conditioner or mower drive mechanism. In some cases, when the mower is raised, the change in angularity between the draft train, which extends rearwardly from the tractor to the conditioner, and the drive train, which extends rearwardly from the tractor to the conditioner, results in the conditioner hitch mechanism striking the conditioner drive train. This may cause damage to the hitch mechanism, the drive train, or both.

Attempts have been made to tow a crop conditioner behind a mounted mower by providing a boom-like structure extending rearwardly from the tractor, up and over the mower and down again to the proper position for connection thereto by the crop conditioner draft member. This is an expensive arrangement and it is detrimental to the high degree of maneuverability accompanying tractor mounted mowers.

It is an object of this invention to provide a hitch structure for towing a crop conditioner behind a tractor mounted mower.

It is another object of this invention to provide a hitch structure for towing a crop conditioner behind a tractor mounted mower without impairing the raising and lowering movement of the mower.

It is another object of this invention to provide a hitch structure for towing a crop conditioner behind a tractor mounted mower wherein the draft connection between the mower and conditioner is rigid and will not permit the transfer of road shocks through the conditioner drive train.

Another object of this invention is to provide a rigid hitch structure for towing a crop conditioner behind a tractor mounted mower wherein there is no binding at the draft connection when the mower is raised and lowered by the tractor.

Another object of this invention is to provide a hitch structure for towing a crop conditioner behind a tractor mounted mower wherein the hitch structure will not interfere with the conditioner drive train upon raising and lowering of the mower by the tractor.

Another object of this invention is to provide a mechanically simple, rugged, inexpensive hitch structure for towing a crop conditioner behind a tractor mounted mower.

These and other objects and advantages of this invention will be apparent upon reference to the following description and claims taken in conjunction with the accompanying drawings wherein:

FIG. 2 is a fragmentary plan view of the apparatus shown in FIG. 1; and

FIG. 3 is a partially diagrammatic fragmentary side elevational view similar to FIG. 1 and showing the mower raised to an inoperative, or transport, position.

Figure 1:
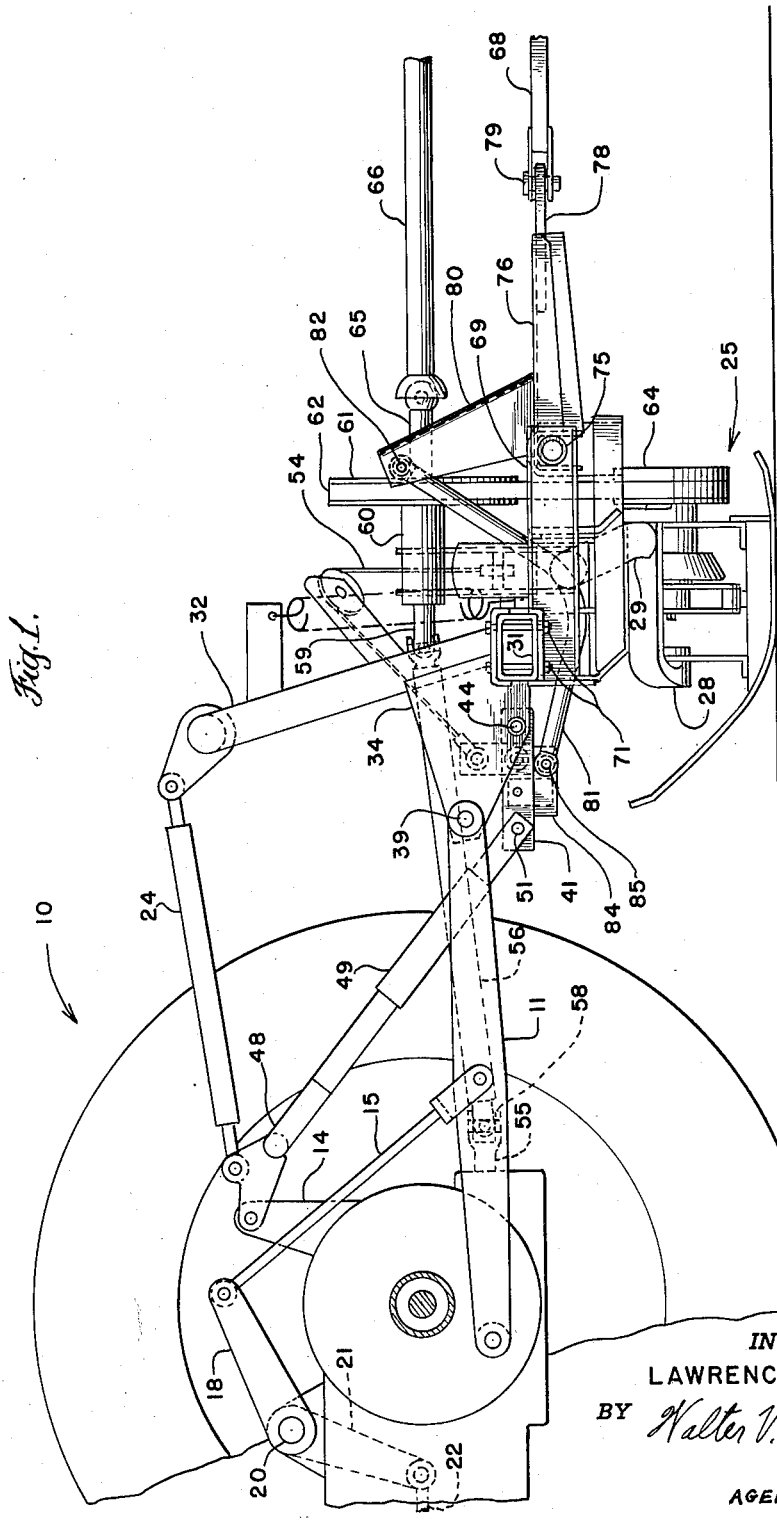
FIG. 1 is a fragmentary side elevational view of a tractor having a mower mounted thereon in operative position and showing how the drawbar and drive shaft of a conventional crop conditioner may be connected to the mower by the use of a hitch structure constructed in accordance with the principles of the present invention.

With reference to the details of the drawings, the numeral 10 indicates, generally, a conventional tractor equipped with a conventional three point implement hitch. The implement hitch comprises a pair of laterally spaced rearwardly extending drawbars 11 and 12 mounted on the tractor body below the axle for vertical swinging movement relative to the tractor, and an upper central pivot hitch member 14. The drawbars are vertically raised and lowered by a pair of lift links 15 and 16. The lift links each have one end pivotally connected to a drawbar and the other end pivotally connected, respectively, to a pair of lift arms 18 and 19. The lift arms 18 and 19 are mounted on opposite ends of a lift shaft 20. The shaft 20 is oscillated by a lever arm 21 connected to the piston rod 22 (FIG. 1) of the tractor hydraulic system and rigidly carried by shaft 20. In controlling the operation of the tractor hydraulic system, the operator controls the raising and lowering of the drawbars 11 and 12; and thereby controls the raising and lowering of the implement mounted on the drawbars. The upper pivot hitch member 14 serves to stabilize the implement against fore-and-aft tipping by the pivotal connection of a rigid upper link 24 to the hitch member 14 and to the implement, in this case a mower.

As best seen in FIG. 2, a mower of the conventional type is shown. It comprises a driving head 25 and an elongated, laterally extending cutter bar 26. The driving head is carried by the bifurcated outboard end 28 of a conventional dragbar 29. The inboard end of dragbar 29 is mounted on a fore-and-aft extending generally horizontal pintle 30 (FIG. 2) which is a part of the mower frame.

The mower frame has two general parts which move relative to each other when the drawbars are raised and lowered. The first, or base, part of the frame comprises a transversely extending main beam 31, on which pintle 30 is mounted, an inverted U-shaped mast 32 rigidly mounted on beam 31, and a pair of left and right arms 34 and 36 which extend forwardly from the legs of mast 32 and beam 31 where the legs of the mast are connected to the beam. The arms 34 and 36, in the embodiment shown (FIG. 2), each comprise a pair of vertical plates indicated by the reference numerals 34, 35, 36 and 38. The arms 34 and 36 are connected, respectively, to the drawbars 11 and 12 by pivot pins 39 and 40. The mast 32 is connected to the upper hitch member 14 through the upper stabilizer link 24.

The second part of the frame comprises (see FIG. 2) a pair of arms 41 and 42 whose rearmost ends are, respectively, pivotally mounted on arms 34 and 36 by pivot members 44 and 45. A rigid frame member 46 (FIG. 2) is welded, or otherwise rigidly connected, to arms 41 and 42 and extends transversely therebetween. A rigid inverted U-shaped structure 48 has its bight portion pivotally connected to upper tractor hitch member 14 and its legs 49 and 50 extending downwardly and rearwardly to the forward ends of arms 41 and 42. Pivot members 51 and 52 connect the rearmost ends of legs 49 and 50, respectively, to the forwardmost ends of arms 41 and 42.

This second portion of the frame, members 48, 41, 42 and 46, performs various functions well known in the mounted mower art, such as: raising the mower cutterbar relative to the dragbar by exerting tension on a cable 54 upon raising of the tractor drawbars; and stabilizing the first mower frame portion against lateral movement, or side sway, relative to the tractor.

What is important to the present invention, however, is simply the fact that this second frame portion moves relative to the first, or main frame portion when the drawbars are raised. This may best be seen by a comparison of FIGS. 1 and 3 of the drawings. It will be seen in FIG. 3 that when the drawbars 11 and 12 swing upwardly to raise the main portion of the mower frame, this carries the rearmost ends of arms 41 and 42 upwardly and slightly forwardly since they are carried on main frame arms, or plates, 34 and 36. The effective result of this movement is that legs 49 and 50 of the rigid U-shaped structure 48 exert downward and rearward thrusts on the forward ends of arms 41 and 42. This pivots the arms 41 and 42 downwardly and rearwardly about the pivot members 44 and 45 which attach the arms 41 and 42 to main frame arms 34 and 36.

The driving power for operating the mower is supplied by a power-take-off shaft 55 which extends rearwardly from the lower central rear portion of the tractor. An extension shaft 56 (FIGS. 2 and 3) has its forward end universally connected to the rear end of the power-take-off shaft as shown at 58. Extension shaft 56 extends rearwardly from universal connection 58 to the forward end of a short shaft 59 which is rotatably carried in a journal 60 mounted on main frame beam 31. Shaft 59 carries a drive pulley 61 which is drivingly connected by a V-belt 62 to a driven pulley 64 on the mower head 25. This drive arrangement, or its equivalent, is well known in the mounted mower art. In the present device, however, the mower drive shaft 59 projects rearwardly beyond drive pulley 61 and has a splined rearwardly projecting end for reception of the coupler 65 of the drive shaft 66 of a conventional crop conditioning implement (not shown).

Crop conditioners, or hay conditioner, are well known. One such implement may be seen in U.S. Patent 3,007,-297. The drive shaft 66 of the hay conditioner and the draft member 68 (FIGS. 1 and 3) of the conditioner extend forwardly from the implement. The drive shaft 66 is above, preferably parallel to, and somewhat longer than the draft member 68.

The hitch structure of the present invention for connecting a conditioner draft member 68 to the mower main frame comprises (see FIG. 2) laterally spaced left and right arms 69 and 70, respectively, extending rearwardly from the main frame. The left arm 69 is rigidly and removably connected to main frame beam 31 by bolts 71. The right arm 70 carries a face plate 72 (FIG. 2) on its forward end. The face plate 72, and therefore the arm 70, is rigidly and removably connected by bolts 74 to the rear end of pintle 30, which carries the mower dragbar. Extending transversely between arms 69 and 70 at the rear ends thereof is a pivot member 75. The ends of pivot member 75 are, respectively, carried by the arms 69 and 70. A generally fore-and-aft extending hitch member 76 is carried by pivot member 75 and extends rearwardly therefrom. The hitch member 76 is of generally triangular shape in plan view with the wide base portion of the triangle carried by pivot member 75 to resist the lateral forces exerted on the hitch member by the conditioning implement during turning. A short apertured drawbar-type member 78 is welded to, or otherwise rigidly provided at, the rear end of hitch member 76 for connection with the conditioner draft member 68 by a draw pin 79. A stanchion 80 projects upwardly from hitch member 76 and is rigid with the hitch member. The stanchion and hitch member together form a rigid bell crank structure which pivots as a unit on member 75. A rigid generally L-shaped link 81 has its rearmost end pivotally connected to the upper end of stanchion 80 by a pivot member 82. Link 81 extends downwardly and forwardly below the main mower frame structure and has its forwardmost end connected to a detent 84 integrally formed on arm 41 of the second portion of the mower frame (see FIG. 1). The connection of arm 41 to detent 84 is by a transverse horizontal pivot member 85.

When the mower frame is elevated by the tractor drawbars as described above, the arm 41 of the second frame portion swings downwardly and rearwardly. This motion, through link 81, pivots the bell crank structure, of which hitch member 76 constitutes one arm, downwardly about pivot member 75 away from drive shaft 66 of the conditioner. As may be seen in FIG. 3, this prevents interference between the draft connection at draw pin 79 and the conditioner drive shaft 66. It retains the conditioner draft member 68 and drive shaft 66 parallel and at the same time prevents binding at the draw pin connection 79. All the connections from the forward pivot member 85 of link 81 to the draw pin 79 are rigid in the fore-and-aft direction.

Since the hitch member of this invention pivots away from the conditioner drive shaft upon raising of the mower, an additional advantage not heretofore mentioned is provided: the drive train extending from a tractor power-take-off shaft to the hay conditioning implement may be kept low and in close proximity to the hay conditioner draft member. Thus, as seen in FIG. 1, when the mower is in operative position, the drive train from the power-take-off shaft of the tractor to the conditioner extends in substantially a straight line. This reduces wear at the drive train universal joints and provides a more constant transmission of driving power from the tractor power-take-off shaft to the hay conditioner than would be realized if the conditioner drive shaft were spaced further above the conditioner draft member, thus, requiring the shafts of the drive train to operate at greater angles relative to each other.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A hitch structure for trailing a crop conditioner behind a tractor mounted mower wherein the mower is carried by the tractor for vertical adjustment relative thereto, said mower having a frame including at least two portions which move relative to each other in response to vertical adjustment of the mower relative to the tractor, and said mower having drive means connectable to the tractor power-take-off mechanism, and wherein the crop conditioner has a forwardly extending drawbar with hitch means at the forward end thereof and a forwardly extending drive shaft disposed above and generally parallel to said drawbar and having connector means disposed forwardly and above said drawbar hitch means for connecting said drive shaft to the drive means on the mower, said hitch structure comprising, a generally fore-and-aft extending hitch member having means at the rear end thereof connectable with the hitch means on said crop conditioner drawbar, means pivotally mounting the forward end of said hitch member on one of the relatively movable portions of said mower frame for vertical pivotal movement relative thereto, and linkage connected to and extending from another one of the relatively movable portions of said mower frame to said hitch member and pivoting the hitch member downwardly away from said drive shaft in response to upward adjustment of said mower relative to said tractor and upwardly toward said drive shaft in response to downward adjustment of said mower relative to said tractor.

2. A hitch structure as recited in claim 1 wherein said means pivotally mounting the forward end of said hitch member on one of the relatively movable portions of the mower frame comprises a pair of laterally spaced, fore-and-aft extending rigid arms, means rigidly and removably connecting the forward ends of said arms to said one portion of the mower frame, and a horizontal transversely extending pivot member disposed between said pair of arms and having its ends mounted on the respective arms of said pair of arms, the forward end of said hitch member being carried by said pivot member.

3. A hitch structure as recited in claim 2 wherein a stanchion is rigidly mounted on said hitch member adjacent said pivot member and forms with said hitch member a rigid bell crank structure, and said linkage is interconnected between the upper end of said stanchion and said another one of the relatively movable portions of said mower frame.

4. A hitch structure as recited in claim 3 wherein said linkage comprises a rigid bar, means pivotally connecting one end of said bar to said another portion of said mower frame, and means pivotally connecting the other end of said bar to the upper end of said stanchion.

5. A hitch structure for trailing a crop conditioner behind a tractor mounted mower wherein the tractor has a pair of laterally spaced fore-and-aft extending vertically swingable drawbars, and wherein the mower has a first frame portion carried by said pair of drawbars for vertical adjustment therewith relative to said tractor and a second frame portion pivotally connected to said first frame portion and to said tractor for vertical pivotal movement relative to said first frame portion in one direction upon raising of said drawbars and in another direction upon lowering of said drawbars, said hitch structure comprising a pair of fore-and-aft extending arms, means rigidly and removably connecting the forward ends of said arms to said first frame portion, said arms being laterally spaced and projecting rearwardly from said first frame portion, a transversely extending pivot member disposed between said pair of arms and having its ends mounted on the respective arms of said pair of arms rearwardly of said first frame portion, a bell crank structure having its apex carried by said pivot member with one arm of the bell crank structure extending upwardly from the pivot member and the other arm of the bell crank structure extending rearwardly from the pivot member, hitch means at the rear end of said other bell crank arm connectable with the draft member of a crop conditioning implement for towing the implement behind the mower, a rigid link arm having one end pivotally connected to said second mower frame portion and the other end pivotally connected to the upper end of the upwardly extending arm of said bell crank structure and exerting force on said upstanding arm in the rearward direction in response to movement of said second frame portion in said one direction relative to said first frame portion to thereby pivot said bell crank structure downwardly about said pivot member in response to raising of said mower by said tractor drawbars.

6. A hitch structure as recited in claim 5 wherein a drive train comprising a plurality of universally connected shafts extends rearwardly from said mower to a crop conditioning implement connected to said hitch means on said other arm of the bell crank structure, said hitch means being disposed below said drive train whereby the draft member of a crop conditioning implement connected to the hitch means extends rearwardly therefrom below and generally parallel to said drive train, said rigid link pivoting said other arm of the bell crank structure downwardly away from said drive train when said mower is raised relative to said tractor to prevent interference between said hitch means and said drive train and to prevent binding between said hitch means and said crop conditioner draft member.

7. A hitch structure for trailing a crop conditioner behind a tractor mounted mower wherein the mower is carried by the tractor for vertical adjustment relative thereto and has drive means connectable to the tractor power-take-off mechanism, and wherein the crop conditioner has a forwardly extending drawbar with hitch means at the forward end thereof and a forwardly extending drive shaft disposed above and generally parallel to said drawbar and having connector means disposed forwardly of and above said drawbar hitch means for connecting said drive shaft to the drive means on the mower, said hitch structure comprising a hitch member connectable with the hitch means on said crop conditioner drawbar, means pivotally mounting said hitch member on said mower for vertical pivotal movement relative thereto, and means interconnected between said hitch member and said mower and pivoting said hitch member downwardly about said mounting means in response to upward adjustment of said mower relative to said tractor and upwardly about said mounting means in response to downward adjustment of said mower relative to said tractor.

References Cited in the file of this patent
UNITED STATES PATENTS
3,078,106   Pedersen _____ Feb. 19, 1963